(12) United States Patent
Thill et al.

(10) Patent No.: US 9,094,053 B2
(45) Date of Patent: Jul. 28, 2015

(54) ELECTRONIC DEVICE COMPRISING ELEMENTS MANAGED BY DIFFERENT STANDARDISED PROTOCOLS AND METHOD FOR MANAGING COMMUNICATION BETWEEN THOSE ELEMENTS

(71) Applicants: Michel Thill, Meudon (FR); Yan Charles, Meudon (FR); Yvon Gressus, Meudon (FR)

(72) Inventors: Michel Thill, Meudon (FR); Yan Charles, Meudon (FR); Yvon Gressus, Meudon (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/362,366

(22) PCT Filed: Nov. 26, 2012

(86) PCT No.: PCT/EP2012/073573
§ 371 (c)(1),
(2) Date: Jun. 2, 2014

(87) PCT Pub. No.: WO2013/079430
PCT Pub. Date: Jun. 6, 2013

(65) Prior Publication Data
US 2014/0334097 A1 Nov. 13, 2014

(30) Foreign Application Priority Data

Dec. 1, 2011 (EP) ..................................... 11306595

(51) Int. Cl.
*G06K 19/07* (2006.01)
*G06K 19/077* (2006.01)
(Continued)

(52) U.S. Cl.
CPC ............ *H04B 5/0031* (2013.01); *G06F 1/1633* (2013.01); *G06K 19/0701* (2013.01); *G06K 19/072* (2013.01); *G06K 19/0715* (2013.01); *G06K 19/07769* (2013.01)

(58) Field of Classification Search
CPC ... H04B 5/0031; G06F 1/1633; G06F 3/0683; G06F 2212/177; G06F 2212/178; G06K 19/07733; G06K 19/145; G06K 19/0701; G06K 19/0715; G06K 19/072; G06K 19/07769
See application file for complete search history.

(56) References Cited

U.S. PATENT DOCUMENTS 5,999,713 A * 12/1999 Reiner et al. ................... 710/301
6,045,043 A *  4/2000 Bashan et al. ................. 235/441
(Continued)

FOREIGN PATENT DOCUMENTS

EP            2202676 A1    6/2010

OTHER PUBLICATIONS

PCT/EP2012/073573 International Search Report, Mar. 1, 2013, European Patent Office, P.B.5818 Patentlaan 2, NL-2280 HV Rijswijk.

*Primary Examiner* — Daniel Walsh
(74) *Attorney, Agent, or Firm* — The Jansson Firm; Pehr B. Jansson

(57) ABSTRACT

The embodiments of this invention relate to an electronic device (9) intended to be installed in a portable device (1), which electronic device comprises: • a microcontroller (13) configured to communicate with a first interface (5) of the portable device in accordance with a first protocol, the said first interface (5) supplying power voltage to the microcontroller, the said power voltage being standardised by the said first protocol, • a secure electronic chip component (15) configured to communicate with a second interface (7) of the portable device in accordance with a second protocol, the said second interface (7) supplying power voltage to the secure component, the said power voltage being standardised by the said second protocol, • means for communication (17) between the secure component (15) and the microcontroller (13), in which the means for communication comprise a module for voltage adaptation (19) depending on the power voltages supplied by the first and second interfaces.

20 Claims, 1 Drawing Sheet

(51) Int. Cl.
  *G06F 1/16*      (2006.01)
  *H04B 5/00*      (2006.01)

(56) References Cited

U.S. PATENT DOCUMENTS

| | | | |
|---|---|---|---|
| 6,637,664 B1 * | 10/2003 | Yoshigi et al. | 235/492 |
| 7,156,314 B2 * | 1/2007 | Kargl | 235/492 |
| 7,805,544 B2 * | 9/2010 | Kim et al. | 710/11 |
| 7,971,791 B2 * | 7/2011 | Nishizawa et al. | 235/492 |
| 8,098,242 B2 * | 1/2012 | Chen et al. | 345/212 |
| 8,381,996 B1 * | 2/2013 | Lee et al. | 235/492 |
| 8,937,460 B2 * | 1/2015 | Chen et al. | 320/162 |
| 2002/0070851 A1 * | 6/2002 | Raichle et al. | 340/438 |
| 2003/0065867 A1 * | 4/2003 | Mowery et al. | 710/310 |
| 2004/0070952 A1 * | 4/2004 | Higuchi et al. | 361/737 |
| 2005/0005045 A1 * | 1/2005 | Kim et al. | 710/74 |
| 2005/0086434 A1 * | 4/2005 | Kang et al. | 711/115 |
| 2005/0182858 A1 * | 8/2005 | Lo et al. | 710/1 |
| 2005/0258243 A1 * | 11/2005 | Hsieh | 235/441 |
| 2006/0186211 A1 * | 8/2006 | Kim et al. | 235/492 |
| 2007/0028126 A1 * | 2/2007 | Wu et al. | 713/300 |
| 2007/0147157 A1 * | 6/2007 | Luo et al. | 365/226 |
| 2007/0150633 A1 * | 6/2007 | Higuchi et al. | 710/301 |
| 2007/0243901 A1 | 10/2007 | Cho | |
| 2007/0283076 A1 * | 12/2007 | Kim et al. | 710/315 |
| 2008/0162954 A1 * | 7/2008 | Lassa et al. | 713/300 |
| 2008/0245878 A1 * | 10/2008 | Shiota et al. | 235/492 |
| 2010/0033310 A1 * | 2/2010 | Narendra et al. | 340/10.51 |
| 2010/0108772 A1 * | 5/2010 | Hartel | 235/492 |
| 2011/0320713 A1 * | 12/2011 | Mambakkam et al. | 711/115 |
| 2013/0132740 A1 * | 5/2013 | Li | 713/300 |
| 2013/0203466 A1 * | 8/2013 | Chen et al. | 455/558 |
| 2013/0238910 A1 * | 9/2013 | Liu et al. | 713/300 |
| 2014/0082247 A1 * | 3/2014 | Buttner et al. | 710/301 |

* cited by examiner

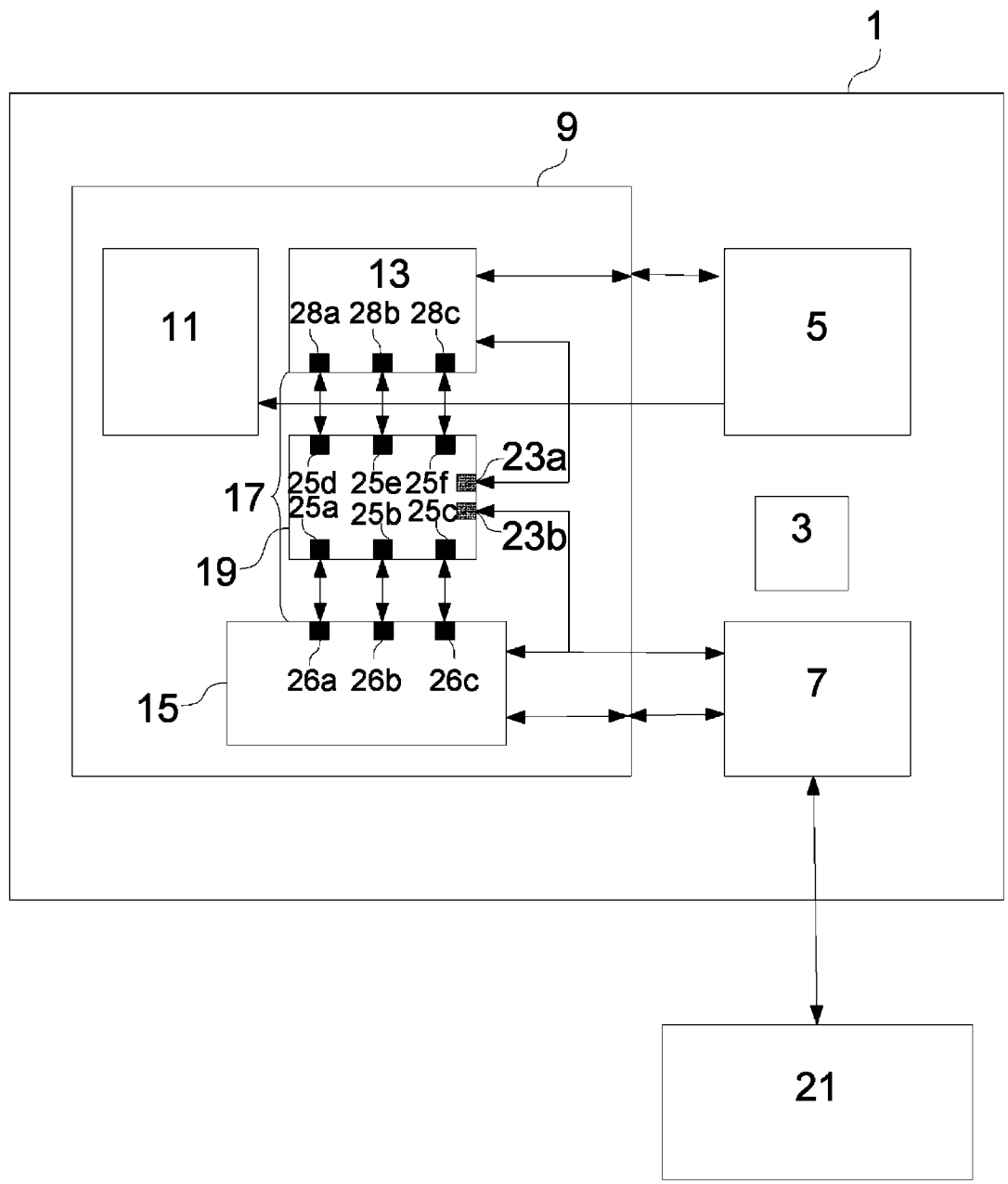

ELECTRONIC DEVICE COMPRISING ELEMENTS MANAGED BY DIFFERENT STANDARDISED PROTOCOLS AND METHOD FOR MANAGING COMMUNICATION BETWEEN THOSE ELEMENTS

BACKGROUND OF THE INVENTION

This invention relates to the area of smart cards, more particularly smart cards designed to be installed in mobile or portable devices, such as for example smart phones, comprising elements managed by different standardised protocols, which elements can be fixed (welded) or removable.

Portable devices are becoming ever more multifunctional so as to allow the management of a series of applications from the same device. For example, these new applications relate to near-field contactless communication, which may be used for contactless payment or for season tickets such as in public transport, where the portable device acts as a transponder and interacts with a dedicated external reader.

Besides, it is obvious that these applications need to be made secure. To that end, secure smart card components are used and installed in the telephone; they contain the secure elements for the different applications.

Besides, means are required to allow communication between the elements of the different applications, to allow the proper working of those applications. For example, the elements of a contactless transmission application for mass transport must be able to communicate with the secure elements that manage Internet connection in order to allow the reloading of credit for the mass transport application via a server.

But these different applications are managed by different protocols, and elements from different applications may be powered with different power voltages, leading to conflict between the voltages used by the different elements and resulting in malfunctioning or even damage to the portable device.

There is therefore a need to offer a solution that makes it possible to avoid voltage conflicts between the constituent elements of the different applications.

SUMMARY

Thus, this invention relates to an electronic device intended to be installed in a portable device, which electronic device comprises:
a microcontroller configured to communicate with a first interface of the portable device in accordance with a first protocol, the said first interface supplying power voltage to the microcontroller, the said power voltage being standardised by the said first protocol,
a secure electronic chip component configured to communicate with a second interface of the portable device in accordance with a second protocol, the said second interface supplying power voltage to the secure component, the said power voltage being standardised by the said second protocol,
means for communication between the secure component and the microcontroller, in which the means for communication comprise a module for voltage adaptation depending on the power voltages supplied by the first and second interfaces.

According to an additional aspect of this invention, the second interface is a hybrid interface that can communicate in accordance with two distinct protocols depending on the status of the portable device, the said second interface being configured to supply power voltage to the secure component that is standardised according to one of the two distinct protocols when the portable device is activated and according to the other of the two distinct protocols when the portable device is switched off and in which the secure component is configured to communicate with the said second interface according to one or the other of the two distinct protocols.

According to an additional aspect of this invention, the electronic device also comprises a non-volatile memory controlled by the microcontroller and supplied with power voltage by the first interface, which voltage is standardised in accordance with the said first protocol.

According to another aspect of this invention, the first protocol is an SD type protocol and the second protocol comprises an SWP type protocol and an ISO 7816 type protocol, the said second interface supplying power voltage to the secure component that is standardised in accordance with the ISO 7816 protocol when the portable device is activated.

According to a supplementary aspect of this invention, the means for communication between the secure component and the microcontroller are standardised in accordance with an ISO 7816 protocol.

According to a supplementary aspect of this invention, the microcontroller and the secure component respectively comprise the first and second ISO 7816 contacts, the voltage adaptation module of the communication means being configured so that when the portable device is activated:
when power is supplied by the first interface,
the first ISO 7816 contacts are powered by voltage equal to the power voltage supplied by the first interface,
the second ISO 7816 contacts are powered by voltage equal to the power voltage of the secure component supplied by the second interface of the portable device,
when no power is supplied by the first interface,
the first ISO 7816 contacts are in state of high impedance,
the second ISO 7816 contacts are controlled by circuits that pull them down or up to make them inactive,
According to an additional aspect of this invention, the microcontroller and the secure component respectively comprise the first and second ISO 7816 contacts, the voltage adaptation module of the communication means being configured so that when the portable device is switched off:
when power is supplied by the second interface,
the first ISO 7816 contacts are in state of high impedance,
the second ISO 7816 contacts are controlled by circuits that pull them down or up to make them inactive,
when no power is supplied by the second interface,
the first and second ISO 7816 contacts are in state of high impedance According to another aspect of this invention, the first and second ISO 7816 contacts comprise a reset contact, a clock contact and an input/output contact.

The embodiments of this invention also relate to a portable device comprising the following:
an electronic device,
a first interface,
a second interface,
power supply means that make it possible to power the first and second interface when the portable device is activated.

According to another aspect of this invention, the first interface comprises a host interface of the SD type and the second interface comprises an interface for exchange with a contactless front-end near-field communication system.

According to a supplementary aspect of this invention, the power voltage supplied by the first interface is a power voltage standardised by the SD protocol ranging between 2.7 and 3.6 volts, and in which the power voltage supplied by the second interface, when the said portable device is activated, is a power voltage standardised by an ISO 7816 type protocol belonging to a first or a second class, the first class being voltage ranging between 1.72 and 1.98 volts and the second class being voltage ranging between 2.7 and 3.3 volts.

According an additional aspect of this invention, the power voltage class standardised by the ISO 7816 protocol depends on negotiation between a controller of the portable device and a subscriber identification module.

According to another aspect of this invention, during contactless front-end near-field communication between the contactless front-end near-field communication system located in the portable device and a reader external to the portable device, when the portable device is switched off, the said second interface is powered by the said external reader via the contactless front-end near-field communication system with power voltage standardised by a SWP protocol ranging between 1.72 and 1.98 volts.

The embodiments of this invention also relate to a method for adapting the voltage in a portable device comprising the following:
  a microcontroller capable of communicating with a first interface of the portable device in accordance with a first protocol, the said first interface supplying power voltage to the microcontroller, the said power voltage being standardised by the said first protocol,
  a secure electronic chip component capable of communicating with a second interface of the portable device in accordance with a second protocol, the said second interface supplying power voltage to the secure component, the said power voltage being standardised by the said second protocol,
  means for communication between the secure component and the microcontroller, in which the voltages sent to the secure component and the microcontroller are adapted by the communication means depending on the power voltages supplied by the first and second interfaces.

According to an additional aspect of this invention, the second interface is a hybrid interface that can communicate in accordance with two distinct protocols depending on the status of the portable device, the said second interface supplying power voltage to the secure component that is standardised according to one of the two distinct protocols when the portable device is activated and according to the other of the two distinct protocols when the portable device is switched off.

According to another aspect of this invention, the first protocol is an SD type protocol and the second protocol comprises SWP type and ISO 7816 type protocols, the ISO 7816 protocol being used when the portable device is activated.

According to an additional aspect of this invention, the communication means comprise an ISO 7816 type connection between the first ISO 7816 contacts located in the microcontroller and the second ISO 7816 contacts located in the secure component, so that when the portable device is activated,
  when power is supplied by the first interface,
    the first ISO 7816 contacts are powered by voltage equal to the power voltage supplied by the first interface, and
    the second ISO 7816 contacts are powered by voltage equal to the power voltage of the secure component supplied by the second interface of the portable device,
  when no power is supplied by the first interface,
    the first ISO 7816 contacts are put in state of high impedance, and
    the second ISO 7816 contacts are controlled by circuits that pull them down or up to make them inactive, According to another aspect of this invention, the communication means comprise an ISO 7816 type connection between the first ISO 7816 contacts located in the microcontroller and the second ISO 7816 contacts located in the secure component, so that when the portable device is switched off,
  when power is supplied by the second interface,
the first ISO 7816 contacts are put in state of high impedance, and
the second ISO 7816 contacts are controlled by circuits that pull them down or up to make them inactive.

Other characteristics and advantages of the invention will appear in the description below, by reference to the attached drawings, which illustrate a possible embodiment, for information and in a non-limitative manner. Besides, the reference numbers with a number and a letter designate the sub-elements of a common reference defined by the number.

BRIEF DESCRIPTION OF THE DRAWINGS

In these drawings:
FIG. 1 represents a diagram of a portable device according to one embodiment of this invention;

DETAILED DESCRIPTION

In the description below, the following are generally designated:
  "SD" stands for Secure Digital and is a non-volatile memory card format using a standardised communication protocol;
  "SWP" stands for Single Wire Protocol and is a standardised communication protocol, generally used between a SIM (Subscriber Identification Module) type card and a near-field communication interface;
  "ISO" stands for the International Standards Organisation;
  "UICC" stands for Universal Integrated Circuit Card.

The embodiments of this invention relate to an electronic device comprising a voltage adaptation module for avoiding voltage conflicts between the elements powered by different power voltages.

FIG. 1 represents a diagram of a portable device 1, for example a mobile telephone, comprising power supply means 3 such as for example a battery, an SD type host interface (or host SD) 5 and a near-field communication (NFC) or contactless front-end near-field communication (CLF) interface 7. The two interfaces 5 and 7 are powered by the power supply means 3 when the portable device is activated. The portable device also comprises an electronic device 9, for example a memory card carrying a security element and comprising a non-volatile memory 11 of the Nand type, for example, a microcontroller 13 of the non-volatile memory and a secure electronic chip component 15, for example a secure integrated circuit of the smart card type. It must be noted that the embodiments of the invention also extend to a configuration in which there is no non-volatile memory and in which the microcontroller 13 simulates the existence of a memory vis-à-vis the SD type host interface 5. The microcontroller 13 is managed by an SD type protocol and is configured to communicate with the SD type host interface 5 in accordance with an SD type protocol. Further, the non-volatile memory 11 and the microcontroller 13 are powered by an SD VDC power supply via the SD type host interface. That SD VDC voltage is standardised by the SD protocol and ranges between 2.7 and 3.6 V. However, the SD VDC voltage is only active when the SD host interface is activated and is 0V when it is not activated.

The secure component 15 is configured to communicate with the near-field contactless communication interface 7 in accordance with an ISO 7816 protocol when the portable equipment is activated. Further, the secure component is powered by SIM VDC power voltage via the near-field contactless communication interface 7. That voltage is called SIM VDC because the near-field contactless communication interface 7 also powers the SIM or UICC card with the same SIM VDC voltage. That voltage varies depending on the class of the SIM or UICC card and is the result of negotiation between a subscriber identification module such as the SIM or UICC card and a portable device controller 1. That SIM VDC voltage ranges between 1.72 and 1.98V (1.8V+/−10%) in the case of a C class card and 2.7 to 3.3V (3V+/−10%) in the case of a B class card.

Besides, in the case of communication between the near-field contactless communication interface 7 and an external reader 21 the said external reader 21 supplies energy to the near-field contactless communication interface 7, which makes it possible to power the secure component even when the portable device is deactivated. In that case, the SIM VDC power voltage supplied to the secure component is standardised by the protocol used by the near-field contactless communication interface 7, for example an SWP protocol where the power voltage ranges between 1.72 and 1.98 V.

The electronic device 9 also comprises communication means 17 between the microcontroller 13 and the secure component 15. The communication means 17 are a connection of the ISO 7816 type that connects three contacts of the microcontroller 13 with three corresponding contacts of the secure component 15, these three contacts being a reset signal, a clock signal and an input/output signal.

However, as the power voltages of the microcontroller 13 and the secure component are different and vary over time depending on the activation of the portable device and the SD type host interface, the communication means 17 also comprise a voltage adaptation module 19 in order to avoid voltage conflicts during communication between the microcontroller 13 and the secure component 15, which could lead to malfunctioning or even damage to the portable device 1.

The voltage adaptation module 19 comprises two inputs 23a and 23b connected to the SD VDC and SIM VDC power voltages respectively supplied by the SD type host interface and the near-field contactless communication interface and six contacts, three 25a, 25b, 25c connected to the three ISO 7816 contacts 26a, 26b, 26c respectively of the microcontroller 13 and three 25d, 25e, 25f connected to the three ISO 7816 contacts 28a, 28b, 28c respectively of the secure component 15.

Thus, the voltage signals sent to the different contacts of the voltage adaptation module depend on the power voltages received at the two inputs 23a and 23b.

The different configurations of the voltage adaptation module 19 depending on the status of the SD type host interface 5 and the status of the near-field contactless communication interface 7 are described below:

Situation 1: The portable device is activated and the SD type host interface is activated:

The SD VDC voltage ranges between 2.7 and 3.6V and the SIM VDC voltage ranges between either 1.72 and 1.98V or between 2.7 and 3.3V depending on the class of the SIM card or the UICC card of the portable device.

The voltages of the signals sent by the voltage adaptation module 19 to the ISO 7816 contacts of the microcontroller 13 then range between 2.7 and 3.6V while the voltages of the signals sent by the voltage adaptation module 19 to the ISO 7816 contacts of the secure component then range between 1.72 and 1.98V if the SIM VDC ranges between 1.72 and 1.98V and between 2.7 and 3.3V if the SIM VDC ranges between 2.7 and 3.3V.

Situation 2: The portable device is activated and the SD type host interface is deactivated:

The SD VDC voltage is 0V and SIM VDC voltage ranges either between 1.72 and 1.98V or between 2.7 and 3.3V.

The ISO 7816 contacts of the microcontroller 13 are connected to a high-impedance status while the ISO 7816 contacts of the secure component are controlled by circuits that pull them down or up to make them inactive.

Situation 3: The portable device is inactivated and there is no near-field contactless communication with an external reader:

The SD VDC voltage is 0V and the SIM VDC voltage is 0V. The different contacts are then at 0V.

Situation 4: The portable device is inactivated and there is near-field contactless communication with an external reader:

The SD VDC voltage is 0V and the SIM VDC voltage ranges between 1.72 and 1.98V.

The ISO 7816 contacts of the microcontroller 13 are connected to a high-impedance status while the ISO 7816 contacts of the secure component are controlled by circuits that pull them down or up to make them inactive.

Further, the voltage adaptation module 19 has a dynamic operating mode, so as to take account of a change in a power voltage, for example if the SD type host interface becomes active during contactless communication. Thus all the scenarios of a change in at least one of the power voltages are addressed and managed by the voltage adaptation module 19 to avoid a voltage conflict between the microcontroller 13 and the secure component 15.

In order to better understand this invention, an example of use of a portable device, a mobile phone in the example, comprising an electronic device like the one described above will now be described.

The mobile phone 1 comprises an SD type host interface 5 for secure transmissions with a smart card 9 and a near-field contactless communication interface 7 for an underground transport season ticket application. In this application, the near-field contactless communication interface 7 comprises an antenna and acts as a transponder, so that when a user with their mobile phone 1 goes through an entry gate of the transport system comprising a near-field contactless reader 21, the radiofrequency signal transmitted by the reader 21 powers the transponder, that is to say the near-field communication interface 7, which can then send back a signal to the reader 21. The signal could for example contain information about the validity of the user's ticket. A valid ticket would then open the gate to the transport system. Further, powering the contactless communication interface via the reader makes it possible for the said interface to power the secure component 15, for example an electronic chip of the smart card circuit type, even when the mobile telephone 1 is switched off, and set up communication using the Single Wire Protocol, and that smart card circuit takes charge of managing the transport season ticket application. Thus, if the ticket contains credit units for journeys, when the user goes through the access gate of the transport system, interaction with the reader 21 decrements the number of credit units remaining in the smart card circuit, regardless of the status of the mobile telephone (switched on or off).

Besides, to recharge a ticket or buy credit units, the user of the mobile telephone logs on via their mobile phone 1 to the server of the company that manages the transport system. The credit units are recharged into the smart card circuit through the SD host interface 5 and the microcontroller 13, then via the ISO 7816 connection 17 between the microcontroller 13 and the smart card circuit 15. During communication via the ISO 7816 connection 17, the voltage is adapted between the microcontroller 13 and the smart card circuit 15 by the voltage adaptation module 19.

Further, it must be noted that the embodiments of this invention are not limited to the protocols listed above, but extend to other protocols, such as for example the Multi Media Card (MMC) protocol.

Thus, the implementation of a voltage adaptation module 19 in the communication means 17 between the microcontroller 13 related to the SD application and the secure component 15 related to the near-field contactless communication application, which adapts the voltage depending on the power voltages supplied to the microcontroller 13 and the secure component 15, makes it possible to avoid all voltage conflicts, regardless of the order of arrival and disappearance of these power voltages, and thus allows the proper working of the different applications of the portable device 1.

The invention claimed is:

1. An electronic device configured to be installed in a portable device, the electronic device comprises:
   a microcontroller configured to communicate with a first interface of the portable device in accordance with a first electronic card communication protocol, the said first interface supplying power voltage to the microcontroller, the said power voltage being standardized by the said first electronic card communication protocol,
   a secure electronic chip component configured to communicate with a second interface of the portable device in accordance with a second electronic card communication protocol, the said second interface supplying power voltage to the secure electronic chip component, the said power voltage being standardized by the said second electronic card communication protocol,
   means for communication between the secure electronic chip component and the microcontroller the means for communication operably connecting the secure electronic chip component to the microcontroller,
   wherein the means for communication comprise a module for voltage adaptation depending on the power voltages supplied by the first and second interfaces.

2. The electronic device according to claim 1, in which the second interface is a hybrid interface that can communicate in accordance with two distinct electronic card communication protocols depending on the status of the portable device, the said second interface being configured to supply power voltage to the secure electronic chip component that is standardized according to one of the two distinct electronic card communication protocols when the portable device is activated and according to the other of the two distinct electronic card communication protocols when the portable device is switched off and in which the secure electronic chip component is configured to communicate with the said second interface according to one or the other of the two distinct electronic card communication protocols.

3. The electronic device according to claim 1 also comprising a non-volatile memory controlled by the microcontroller and supplied with power voltage by the first interface, which voltage is standardized in accordance with the said first electronic card communication protocol.

4. The electronic device according to claim 2 in which the first electronic card communication protocol is an SD type protocol and the second electronic card communication protocol comprises an SWP type protocol and an ISO 7816 type protocol, the said second interface supplying power voltage to the secure electronic chip component standardized in accordance with the ISO 7816 protocol when the portable device is activated.

5. The electronic device according to claim 1, in which the means for communication between the secure electronic chip component and the microcontroller (13) are standardised in accordance with an ISO 7816 protocol.

6. The electronic device according to claim 1 in which the microcontroller and the secure electronic chip component respectively comprise the first and second ISO 7816 contacts, the voltage adaptation module of the communication means being configured so that when the portable device is activated:
   when power is supplied by the first interface,
      the first ISO 7816 contacts are powered by voltage equal to the power voltage supplied by the first interface, the second ISO 7816 contacts are powered by voltage equal to the power voltage of the secure electronic chip component supplied by the second interface of the portable device,
   when no power is supplied by the first interface,
      the first ISO 7816 contacts are in state of high impedance, the second ISO 7816 contacts are controlled by circuits that pull them down or u to make them inactive.

7. The electronic device according to claim 1 in which the microcontroller and the secure electronic chi component respectively comprise the first and second ISO 7816 contacts, the voltage adaptation module of the communication means being configured so that when the portable device is switched off:
   when power is supplied by the second interface,
      the first ISO 7816 contacts are in state of high impedance, the second ISO 7816 contacts are controlled by circuits that pull them down or u to make them inactive,
   when no power is supplied by the second interface,
      the first and second ISO 7816 contacts are in state of high impedance.

8. The electronic device (9) according to claim 5 in which the first and second ISO 7816 contacts comprise a reset contact (28a; 26a), a clock contact (28b; 26b) and an input/output contact (28c; 26c).

9. A portable device comprising:
   an electronic device;
   a first interface;
   a second interface; and
   power supply means that make it possible to power the first and second interface when the portable device is activated;
   wherein the electronic device (9) comprises:
      a microcontroller configured to communicate with a first interface of the portable device in accordance with a first electronic card communication protocol, the said first interface supplying power voltage to the microcontroller, the said power voltage being standardized by the said first electronic card communication protocol, a secure electronic chip component configured to communicate with a second interface of the portable device in accordance with a second electronic card communication protocol, the said second interface supplying power voltage to the secure electronic chip component, the said power voltage being standardized by the said second electronic card communication protocol, and means for communication between the secure component and the microcontroller the means for communication operably connecting the secure electronic chip component to the microcontroller, wherein the means for communication comprise a module for voltage adaptation depending on the power voltages supplied by the first and second interfaces.

10. The portable device according to claim 9 in which the first interface comprises a host interface of the SD type and the second interface comprises an interface for exchange with a contactless front-end near-field communication system.

11. The portable device according to claim 10 in which the power voltage supplied by the first interface is a power voltage standardized by the SD protocol ranging between 2.7 and 3.6 volts, and in which the power voltage supplied by the second interface, when the said portable device is activated, is a power voltage standardized by an ISO 7816 type protocol belonging to a first or a second class, the first class being voltage ranging between 1.72 and 1.98 volts and the second class being voltage ranging between 2.7 and 3.3 volts.

12. The portable device according to claim 11 in which the power voltage class standardized by the ISO 7816 protocol depends on negotiation between a controller of the portable device and a subscriber identification module.

13. The portable device according to claim 10 in which during contactless front-end near-field communication between the contactless front-end near-field communication system and a reader external to the portable device, when the portable device is switched off, the said second interface is powered by the said external reader via the contactless front-end near-field communication system with power voltage standardised by a SWP protocol ranging between 1.72 and 1.98 volts.

14. A method for adapting the voltage in a portable device including:
   a microcontroller (13) capable of communicating with a first interface of the portable device in accordance with a first electronic card communication protocol, the said first interface supplying power voltage to the microcontroller (13), the said power voltage being standardized by the said first electronic card communication protocol,
   a secure electronic chip component capable of communicating with a second interface of the portable device in accordance with a second electronic card communication protocol, the said second interface supplying power voltage to the secure electronic chip component, the said power voltage being standardized by the said second electronic card communication protocol,
   means for communication between the secure electronic chip component and the microcontroller the means for communication operably connecting the sure electronic chi component to the microcontroller,
   in which the voltages sent to the secure electronic chi component and the microcontroller are adapted by the communication means depending on the power voltages supplied by the first and second interfaces.

15. The method according to claim 14 in which the second interface is a hybrid interface that can communicate in accordance with two distinct electronic card communication protocols depending on the status of the portable device, the said second interface supplying power voltage to the secure electronic chip component that is standardized according to one of the two distinct electronic card communication protocols when the portable device is activated and according to the other of the two distinct electronic card communication protocols when the portable device is switched off.

16. The method according to claim 15 in which the first electronic card communication protocol is an SD type protocol and the second protocol comprises SWP type and ISO 7816 type protocols, the ISO 7816 protocol being used when the portable device is activated.

17. The method according to claim 16 in which the communication means comprise an ISO 7816 type connection between the first ISO 7816 contacts located in the microcontroller (13) and the second ISO 7816 contacts located in the secure electronic chip component, so that when the portable device is activated,
   when power is supplied by the first interface, the first ISO 7816 contacts are powered by voltage equal to the power voltage supplied by the first interface, and the second ISO 7816 contacts are powered by voltage equal to the power voltage of the secure electronic chip component supplied by the second interface of the portable device,
   when no power is supplied by the first interface, the first ISO 7816 contacts are put in state of high impedance, and
   the second ISO 7816 contacts are controlled by circuits that pull them down or up to make them inactive, 18. The method according to claim 16 in which the communication means comprise an ISO 7816 type connection between the first ISO 7816 contacts located in the microcontroller (13) and the second ISO 7816 contacts located in the secure electronic chip component, so that when the portable device is switched off,
   when power is supplied by the second interface,
      the first ISO 7816 contacts are put in state of high impedance, and
      the second ISO 7816 contacts are controlled by circuits that pull them down or up to make them inactive.

19. The electronic device according to claim 2 also comprising a non-volatile memory controlled by the microcontroller and supplied with power voltage by the first interface, which voltage is standardised in accordance with the said first electronic card communication protocol.

20. The electronic device according to claim 3 in which the first electronic card communication protocol is an SD type protocol and the second electronic card communication protocol comprises an SWP type protocol and an ISO 7816 type protocol, the said second interface supplying power voltage to the secure electronic chip component standardised in accordance with the ISO 7816 protocol when the portable device is activated.

* * * * *